United States Patent [19]

Apperson et al.

[11] Patent Number: 4,719,672
[45] Date of Patent: Jan. 19, 1988

[54] CLAMP BODY FOR CABLE CONDUCTOR

[75] Inventors: Kenneth P. Apperson, Pinson; James D. Glass, Birmingham, both of Ala.

[73] Assignee: Square D Company, Palatine, Ill.

[21] Appl. No.: 861,761

[22] Filed: May 9, 1986

[51] Int. Cl.⁴ .............................................. F16G 11/06
[52] U.S. Cl. .................................... 24/135 R; 248/63
[58] Field of Search ............ 24/135 R, 135 A, 135 K, 24/135 L; 248/65, 74; 174/40 R

[56] References Cited

U.S. PATENT DOCUMENTS

| | | | |
|---|---|---|---|
| 951,298 | 3/1910 | Austin | 24/135 L |
| 1,699,781 | 1/1929 | Ellis | 24/135 L |
| 2,432,635 | 12/1947 | Van Ryan | 24/135 R |
| 4,183,686 | 1/1980 | De France | 24/135 K X |
| 4,383,668 | 5/1983 | Hall | 24/135 L X |

FOREIGN PATENT DOCUMENTS

| | | | |
|---|---|---|---|
| 525319 | 5/1931 | Fed. Rep. of Germany | 248/63 |
| 272051 | 2/1930 | Italy | 248/63 |
| 636197 | 4/1950 | United Kingdom | 248/63 |

Primary Examiner—Peter A. Aschenbrenner
Assistant Examiner—James R. Brittain
Attorney, Agent, or Firm—Stephen A. Litchfield

[57] ABSTRACT

A novel apparatus for clamping a cable in an overhead transmission line system. Said apparatus comprising an elongated clamp having a lower half and an upper half, said lower half having openings to receive U-bolts therethrough to secure the upper half thereto. The lower half having means for allowing the U-bolts to free the upper half from the lower half without disassembling the entire U-bolt assembly. Said means including a slot and an opening, each to receive a leg of the U-bolt, said opening having an interior beveled area to allow the U-bolt to tilt away from the clamp body and said slot permitting a leg of the U-bolt to rotate away from the clamp body. The upper half of the clamp having grooves for retaining the U-bolts, each groove on one side of the clamp having a pair of retainers adjacent thereto crimped over the U-bolt and on the opposite side having a reduced wall area to allow the U-bolt to be lifted off of the grooved area.

3 Claims, 12 Drawing Figures

CLAMP BODY FOR CABLE CONDUCTOR

This application is related to but in no way dependent upon the co-pending application of same inventorship entitled "Clamp Body For Fiber Optic Composite Cable" filed concurrently herewith and bearing Ser. No. 861,678.

BACKGROUND OF THE INVENTION

This invention relates in general to the manufacture of clamping members for clamping electric cables in overhead transmission lines, and in particular to an apparatus for mechanically clamping a cable conductor in a clamp without completely disassembling the clamp.

Traditional clamp means for clamping metallic wound cable in an overhead transmission system have comprised upper and lower clamp sections, commonly called a keeper and a body, with each section having a groove therein for receiving the metallic conductor. A means for securing the upper half section to the lower half section of the clamp, such as pairs of U-bolts, is then employed to compress the cable within the grooved sections of the upper and lower half portions of the clamp. The U-bolts are received into openings in the upper and lower clamp sections and torqued together with a pair of nuts threaded onto the U-bolts. In the past, this method of clamping has required that the entire clamp assembly be disassembled to install the conductor in the grooves. Where an overhead transmission system is being installed this complete disassembly of all of the clamps consumes a substantial amount of time and effort. Also, the various components of the clamp, such as U-bolts and nuts, can be lost thereby further obstructing and delaying the construction of the transmission system. An example of a previous electric cable clamping method is shown in U.S. Pat. No. 1,215,201, to Sandford. This device shows a clamp for a conductor which when tightened over the conductor will create stresses therein that will compress the conductor. As is typical in cable clamps of the prior art design, the Sandford clamp has four bolts and nuts used to clamp the upper section over the lower section. These must be dismantled entirely to install or service the conductor.

It is an object of the present invention to provide a clamp device having upper and lower clamp sections secured together by U-bolts, where said U-bolt receiving structure in the clamp sections have means to allow the U-bolts to free the upper section of the clamp for assembly of a conductor therein without entirely removing the U-bolt from the clamp.

Further objects and advantages of the invention will in part become apparent as the following description proceeds. The features of novelty which characterize the invention will be pointed out with particularity in the claims next to and forming a part of this specification.

SUMMARY OF THE INVENTION

The present invention as disclosed herein is shown used in connection with a clamp for fiber optic composite cable as disclosed in co-pending application Ser. No. 861,678. Thus, some of the following descriptions will relate to use of the invention claimed herein on a fiber optic conductor.

In one embodiment, the clamp comprises an apparatus having a upper half section and a lower half section. Each section has a groove therein which, when the upper half section and the lower half section are secured together, the grooved sections form an opening therein to hold the conductor. The lower clamp section has openings to the sides thereof to receive pairs of U-bolts. The openings are comprised such that one pair has an opening through the lower half section in the shape of a circular opening with an upper portion of the opening beveled. The other corresponding opening of the U-bolt section on the lower clamp is open, forming a slot, allowing a non-stressed U-bolt to be swung away from the clamp section, thereby freeing the upper clamp section. The U-bolt receiving areas on the opposite side of the lower clamp section do not have the slot or beveled features but are formed as two pairs of openings to receive the U-bolts of that side. The upper clamp section has retainers formed thereon which are crimped over the U-bolts to prevent a loosened U-bolt from being removed from the upper clamp section. This permits the insertion or removal of the cable without disassembly of the entire clamp.

The grooves in the clamp sections for receiving the conductor have the clamp body adjacent the groove angled. This angling creates an open area with respect to the upper die section and the lower die section when they are secured together. The angle on each of the sides adjacent the grooves on the upper and lower clamp sections permit the clamp section and also the groove to "flex" as it is clamped over the cable. The flexing of the groove around the conductor spreads the force of the clamp around the circumference of the cable in a radial direction rather than linearly thereby minimizing the concentration of the clamping force on the cable at any one point. Since the clamping force is evenly spread around the circumference of the conductor, no single portion of the conductor is compressed to the point of significantly deforming fiber optic cable. The radius of the grooves are approximately the same as that of the cable, and each groove forms slightly less than a half circle. This creates a gap between the grooves when the cable is installed and prior to tightening the U-bolts to clamp the cable. This gap is reduced as the U-bolts are tightened. As the gap is reduced, the upper section and the lower section will flex due to the angled portion adjacent the groove and the bending moment caused by the location of the U-bolt forces on the clamp. As the gap is reduced, the radii of the grooves are also reduced. This causes the forces applied to the cable to be more radial than linear. This permits the clamp to evenly distribute the force across the cable and mechanically and securely connect the conductor in the clamp with minimal deformation to the fiber optic core of the cable.

When the cable is desired to be removed from the clamp, the U-bolts on the lower clamp section are partially unthreaded such that the U-bolts on the side of the lower clamp section having the slotted openings may be lifted over the U-bolt retaining portion on the upper clamp section and swung away from the clamp. The upper clamp section may then be lifted off of the lower clamp section to access the grooves for installing or servicing the cable without disassembling the entire clamp apparatus.

The above described invention presents a clamping apparatus that will effectively form a mechanical and secure connection between a fiber optic composite cable and the clamp for use in an overhead transmission line system. The clamp provides for efficient installation of the fiber optic cable without disassembly of the entire clamp and permits the disassembly or removal of the fiber optic cable of an installed conductor without disassembly of the entire clamp from the system.

BRIEF DESCRIPTION OF THE DRAWINGS

The features of the present invention which are believed to be novel are set forth with particularlity in the appended claims. The invention together with further objects and advantages thereof may best be understood by reference to the following description, taken in conjunction with the accompanying drawings and the several figures of which like reference numerals identify like elements and in which:

Detailed Description

Figure 1:
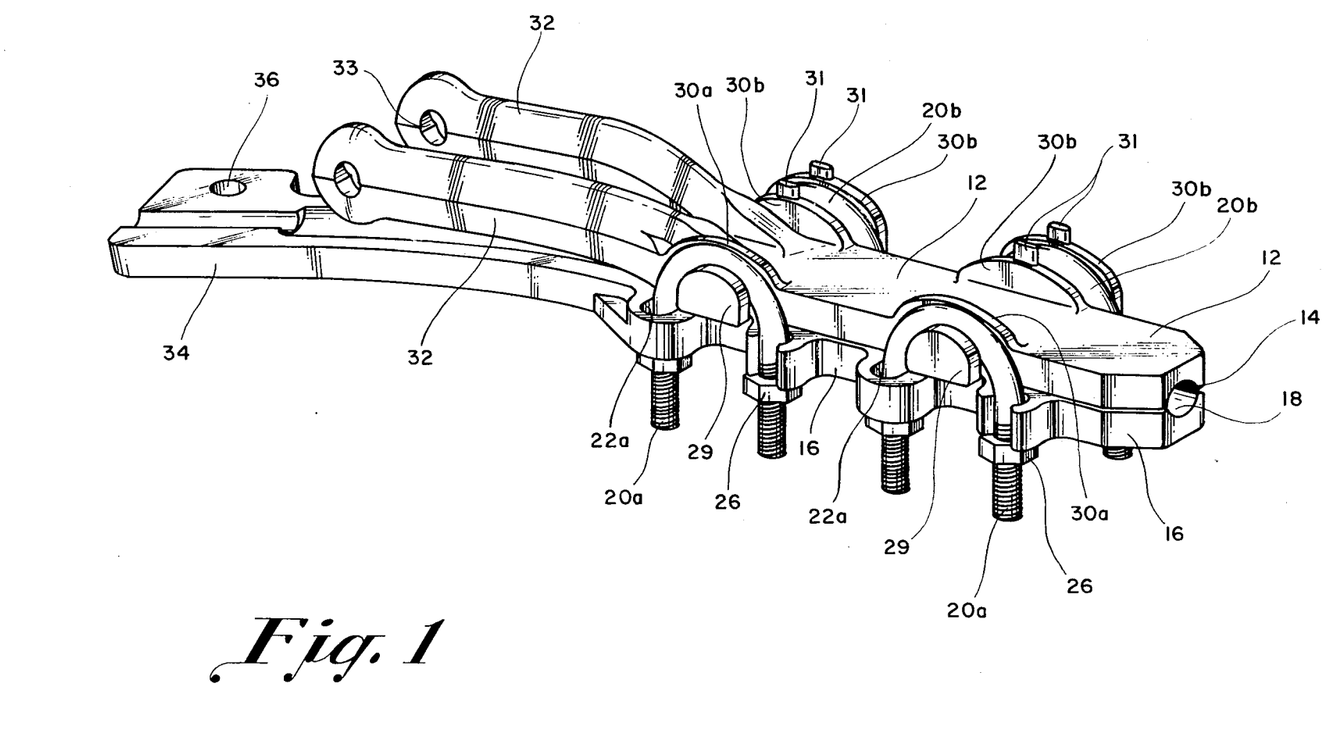
FIG. 1 is a top perspective view of the clamp of the present invention showing the U-bolts securing the upper and lower clamp sections.

Referring now to FIG. 1, the invention is shown as clamp 10 generally in the form of a straight line type deadend clamp. While a straight line deadend type clamp is depicted throughout the figures it is stressed herein that the essence of the invention may be employed in a variety of clamps for different types of usages, such as a suspension clamp or other type of deadend clamp. Clamp 10 has upper clamp section 12 shown disposed over lower clamp section 16. Upper clamp section 12 has upper clamp section groove 14 aligned with lower clamp section groove 18. Grooves 14 and 18 cooperate to form an opening in which the fiber optic conductor (not shown) is secured. Upper clamp section 12 and lower clamp section 16 are secured to one another by virtue of pairs of U-bolts 20(a) and 20(b) shown disposed on each side of the upper and lower clamp sections 12 and 16. Upper clamp section 12 has formed therein U-bolt clamping walls 30(a) and 30(b) to retain the curved portion of the U-bolts to the upper clamp section 12. It should be noted that upper clamp section 12 has U-bolt release walls 29 formed on the outer side of a select side of the upper clamp section 12. U-bolt release walls 29 have a reduced height and width with respect to U-bolt clamping walls 30(a). This feature allows the corresponding U-bolts 20(a) to be lifted over the U-bolt release walls 29.

Upper clamp section 12 has arms 32 formed thereon having openings 33 therein to allow for securing the clamp assembly 10 to a support structure with a clevis pin inserted through openings 33 (not shown).

The lower clamp section 16 has cable guide 34 extending therefrom which guides the fiber optic cable into the clamping section of the clamp 10. The cable guide 34 of lower clamp section 16 has opening 36 therein to connect to an additional upper clamp section commonly referred to as a keeper (not shown). Nuts 26 secure U-bolts 20(a) and 20(b) to the underside of lower clamp section 16. By tightening nuts 26 on U-bolts 20(a) and 20(b), the cable is clamped in clamp 10. It should be noted that in FIG. 1 the U-bolts 20(a) have one leg inserted in opening 22(a) and another leg inserted in slot 24. The insertion of the U-bolts 20(a) in openings 22(a) and slots 24 in combination with the U-bolt release wall 29 which has a reduced size with respect to U-bolt clamping wall 30(a) permits the U-bolts 20(a) to be lifted over the U-bolt release wall and swung away from the clamp 10, thereby freeing one side of the upper clamp section 12. By loosening the nuts 26 on the remaining U-bolts 20(b), on the opposite side of the clamp 10, the upper clamp section 12 may be lifted with respect to the lower clamp section 16 to expose the grooved sections of upper clamp section 12 and lower clamp section 16 for installation or replacement of the cable. U-bolt retainers 31 are shown formed on the U-bolt clamping walls 30(b) to prevent U-bolts 20(b) from being lifted off the clamping walls 30(b). U-bolt retainers 31 are crimped over the U-bolts 20(b) to captively hold the U-bolts 20(b) to the upper clamp section 12.

Figure 2:
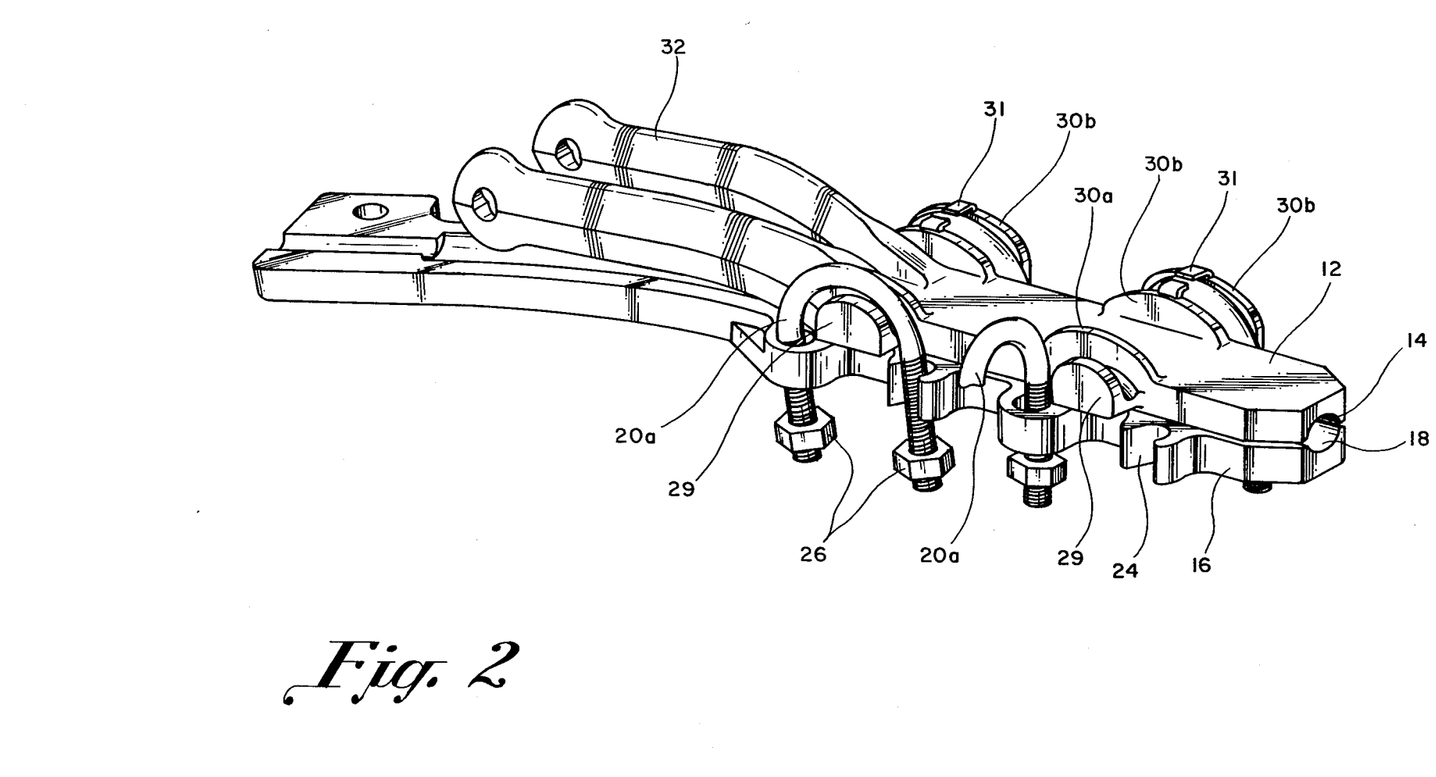
FIG. 2 is a top perspective view of the clamp apparatus showing one of the U-bolts removed and the other lifted off of the upper clamp section such that the upper clamp section may be lifted off of the lower clamp section thereby exposing the fiber optic conductor in the clamp.

FIG. 2 shows the clamp 10 having U-bolt 20(a) swung out of slot 24 and, pivoted about opening 22(a). Also, the remaining U-bolt 20(a) is shown with nuts 26 substantially unthreaded and with that U-bolt 20(a) lifted off of U-bolt release wall 29. It should be noted that U-bolts 20(b) remain in place but have been loosened to permit the lifting of the upper clamp section 12 with respect to lower clamp section 16. Again, the fiber optic conductor is not shown in FIG. 2.

Figure 3:
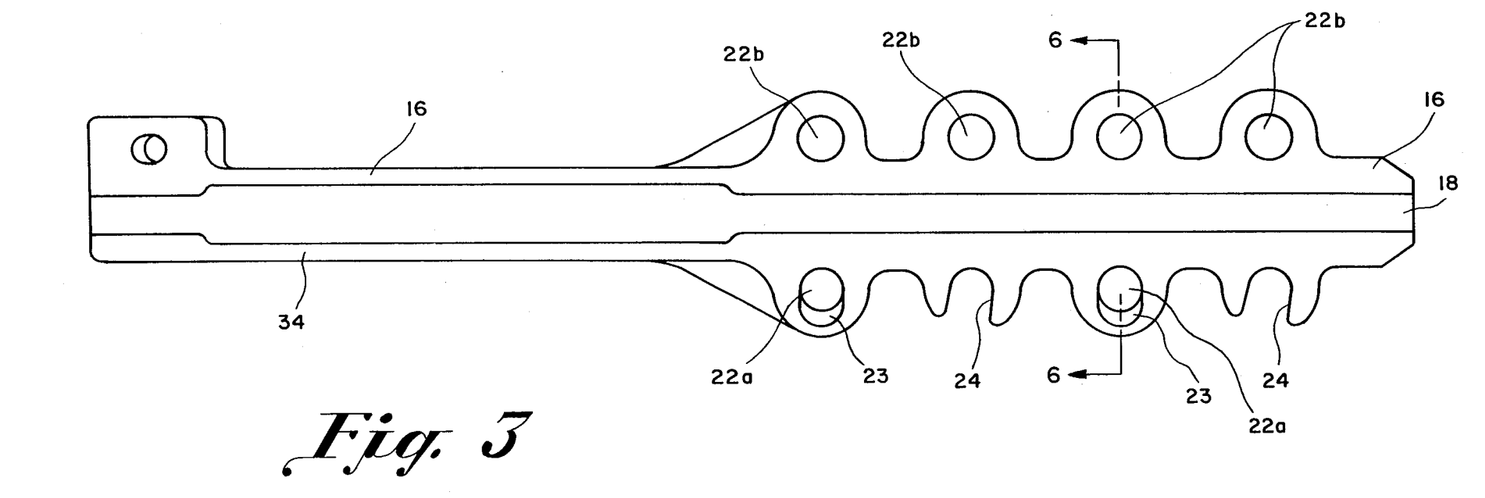
FIG. 3 is a top plan view of the lower clamp section of the clamping apparatus.

FIG. 3 illustrates a top view of the bottom section 16 of the cable clamp 10. FIG. 3 illustrates the openings 22(a) and 22(b) as well as slots 24. Openings 22(b) are paired to receive the U-bolts 20(b). Slots 24 and openings 22(a) receive U-bolts 20(a). It should be noted that openings 22(a) in lower clamp section 16 have a beveled section 23. This beveled section 23 permits U-bolts 20(a) to rest in a relatively low position with respect to lower clamp 16 when they have been removed from U-bolt release wall 29. This keeps U-bolts 20(a) from obstructing the exposed area between upper section 12 and lower section 16 when upper section 12 is lifted off of lower section 16 when installing a conductor. Groove 18 is shown in FIG. 3 extending the length of the lower clamp section 16 and through the cable guide section 34. When installed, the fiber optic conductor would lie in groove 18.

Figure 4:
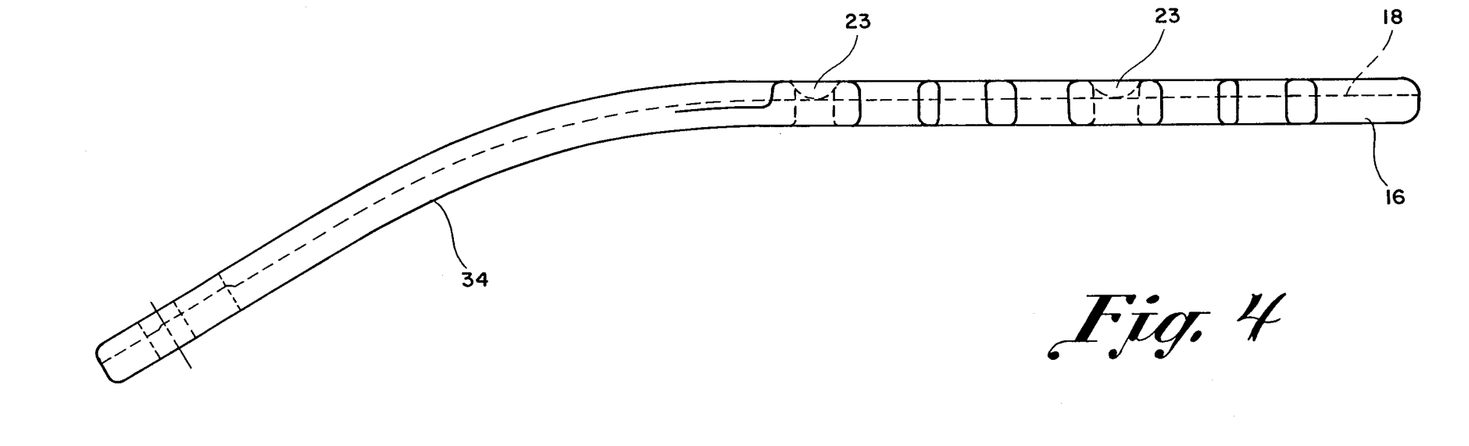
FIG. 4 is a side view of the lower clamp section of the clamping apparatus.
Figure 5:
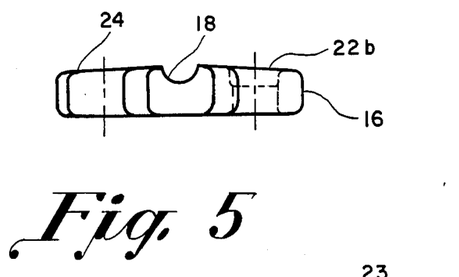
FIG. 5 is an end view of the lower clamp section of the clamping apparatus.

FIG. 4 shows a side view of lower clamp section 16. The beveled sections 23 of openings 22(a) are shown in dotted line. Cable guide section 34 of lower clamp section 16 is curved to guide a fiber optic cable in a desired direction away from the clamp without radical bending of the cable. Radical bending of the cable would crush the core tube and damage the fiber optic conductors inside. FIG. 5 is an end view of lower clamp section 16 showing the relative depth of groove 18 in the lower clamp section 16. Openings 22(a) and (b) are shown to each side of groove 18.

Figure 6:
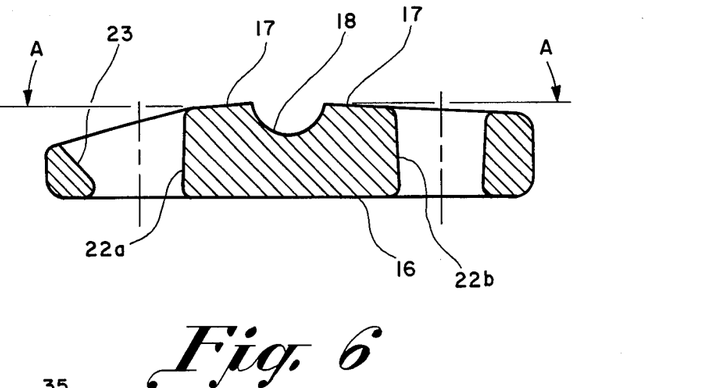
FIG. 6 is a section view of the lower clamp member of the clamping apparatus taken along section line 6—6 shown in FIG. 3.
Figure 11:
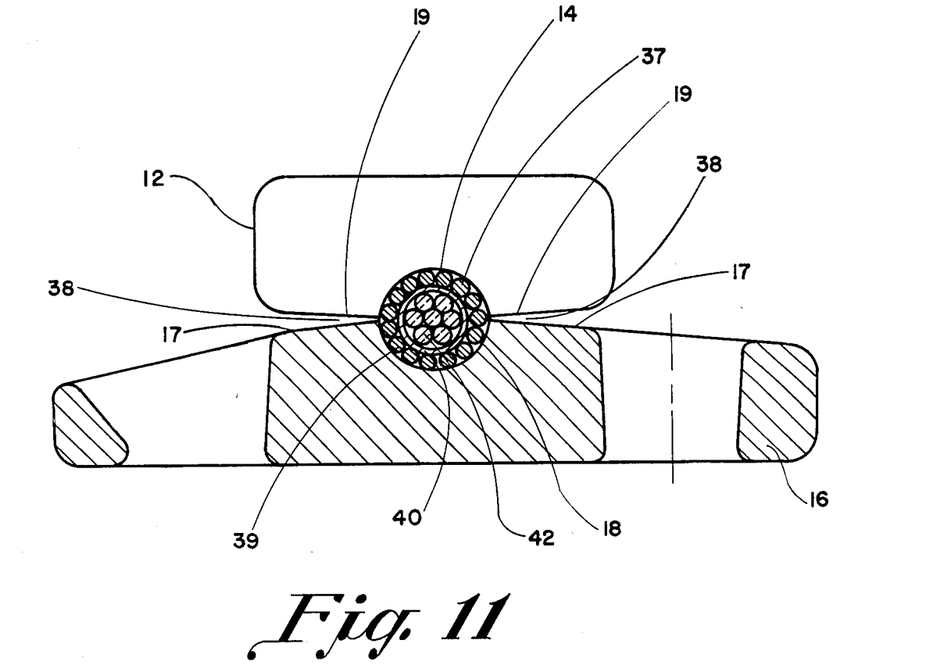
FIG. 11 is a section view of the clamping apparatus having a fiber optic conductor therein, prior to stressing the upper section member and the lower section member about the conductor.

FIG. 6 shows a section end view of lower section 16, taken along section lines 6—6 of FIG. 3. Opening 22(b) is shown disposed adjacent groove 18 and opening 22(a) is shown disposed adjacent the opposite side of groove 18. Beveled section 23 is shown formed therein and is at an angle of approximately 45 degrees from the horizontal. Opening 22(b) is approximately 9/16 of an inch in diameter. Opening 22(a) would have the same diameter except that the upper portion is greater due to the beveling of end 23. Lower section 16 is ⅝ inches thick measured from the beginning of the groove 18. Lower section 16, as shown in FIG. 6, is 3¼ inches wide. In one use, groove 18 would have a 0.469 inch diameter which would match a 0.469 diameter fiber optic composition conductor. However, the cable diameter may vary in diameter. Thus, the diameter of groove 18 will vary also depending on the cable size such that the groove diameter 18 is always approximately equal to the cable diameter. Groove 18 forms slightly less than a half circle. When assembled with lower section 16, the clamp 10 will provide a gap 38 as shown in FIG. 11. This gap 38 in combination with the angled portion adjacent the groove described below allows for the application of radial loading of the fiber optic composite cable.

It should be noted in FIG. 6 that the upper section 17 of lower clamp section 16 has an angle to the horizontal. In other words, both sides of upper section 17 slope away from the lower clamp groove 18. In one embodiment this slope is at 3 degrees to the horizontal, and is shown as angle A. This angle away from the horizontal from lower groove 18 permits the lower clamp section 16 to flex upwardly as the U-bolts are tightened to clamp a fiber optic conductor between upper clamp section 12 and lower clamp section 16. This flexing allows the grooves 18 and 14 to compress radially around the total circumference of the fiber optic cable rather than just at the outermost ends. This avoids the build up of a linear stress and force at a particular point on the cable which would cause a crushing of the fiber optic strands.

Figure 7:
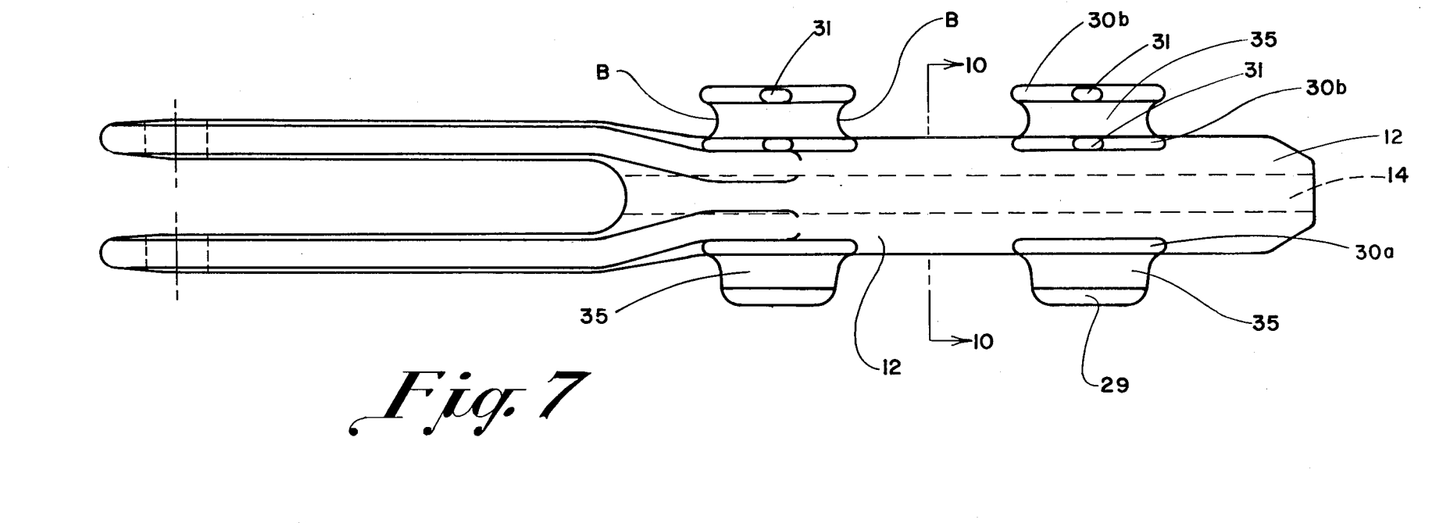
FIG. 7 is a top plan view of the upper section member of the clamping apparatus.
Figure 8:
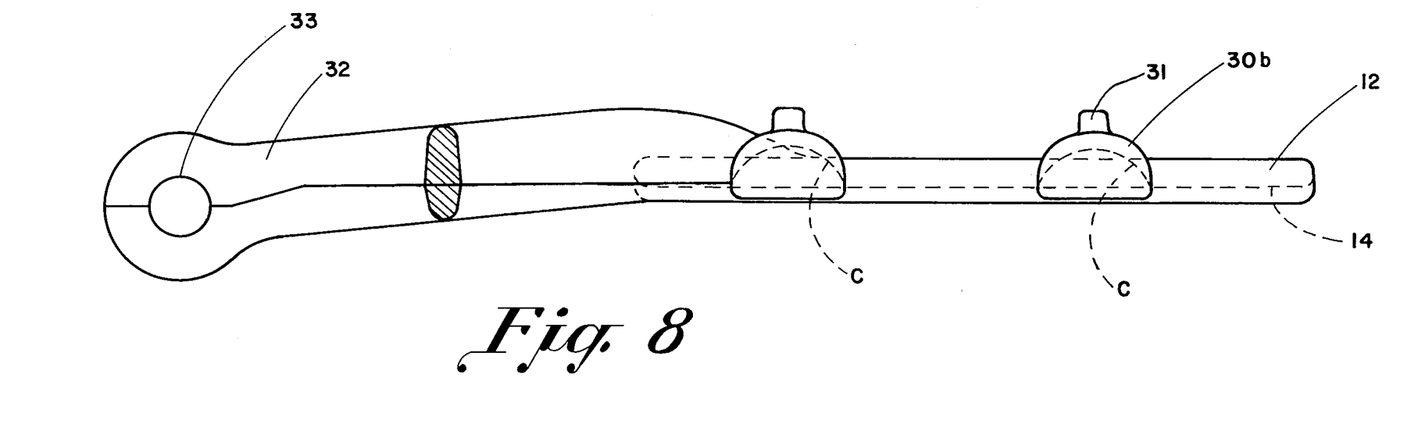
FIG. 8 is a side view of the upper member of the clamping apparatus.

FIG. 7 is a top view of upper clamp section 12. Arms 32 are shown extending from upper clamp section 12. Arms 32 have openings 33 therein to receive a connecting bolt or clevis (not shown) for securing the clamp 10 to a support structure. Upper clamp section groove 14 is shown in dotted line representing that it is on the underside of the upper clamp section 12 as shown in FIG. 7. Grooves 35 are also shown in FIG. 7 representing the portion formed between the U-bolt clamping walls 30(a) and 30(b) for retaining the U-bolts. U-bolt retainers 31 are shown formed on U-bolt clamping walls 30(b) and will be crimped over U-bolts 20(b) when the U-bolts are installed. It should be noted that the length of U-bolt release wall 29 is less than that of the U-bolt clamping wall 30(a) as shown in FIGS. 1 and 2 the height of U-bolt release wall 29 is also less than U-bolt clamping wall 30(a). Again, this allows the U-bolt 20(a) to be lifted off of the U-bolt release wall 29 when the U-bolt is lifted up with respect to opening 22(a) and tilted on the bevel 23. The U-bolt 20(a) then is swung out of slot 24 to free the upper clamp 12 with respect to the lower clamp 16. The U-bolt retainers 31 prevent a loosened U-bolt 20(b) from lifting out of the grooves 35 and over the retaining walls 30(b) when the upper clamp 12 is moved with respect to lower clamp 16. FIG. 8 illustrates the side view of upper clamp section 12.

In one embodiment, upper clamp section 12 has an overall length of 15 inches taken from the center line of opening 33 to the end of the clamp. U-bolt clamping walls 30(a) and (b) are two inches in length and groove 35 has a 15/64 radius at B shown in FIG. 7 and a 49/64 inch radius shown at C on FIG. 8. Retaining walls 30(b) have a one inch radius taken from the same center point as radius C. The upper groove 14 has a diameter of 0.469 inches, consistent with the lower groove diameter of lower clamp groove 18. However, as indicated previously this diameter will vary to accommodate various sized conductors.

Figure 9:
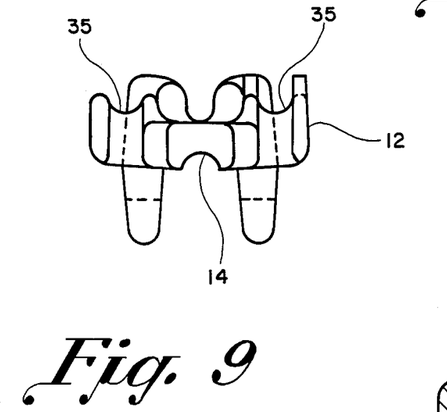
FIG. 9 is an end view of the upper member of the clamping apparatus.
Figure 10:
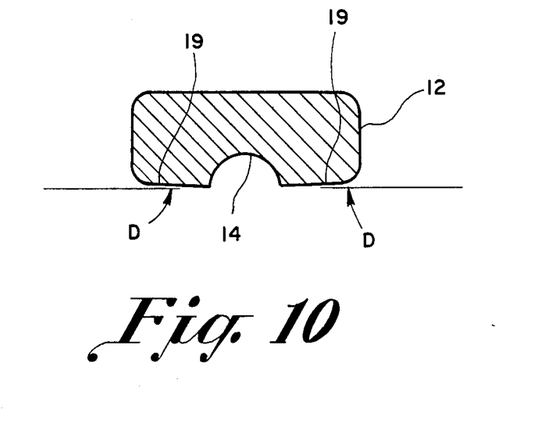
FIG. 10 is a section view of the upper member of the clamping apparatus taken along section line 10—10 shown in FIG. 7.

FIG. 9 shows upper clamp section 12 in an end view with upper groove 14 disposed between grooves 35 which receive U-bolts 20(a) and 20(b). FIG. 10 shows a cross section view of upper clamp section 12 taken along sections lines 10—10 in FIG. 7. Upper clamp section 12 has groove 14 therein and is 1 17/32 inches wide and ⅝ inches thick. These dimensions are in one embodiment of the invention. Underside 19 of top section 12 is angled with respect to the horizontal. Under side 19 has an approximate 3 degree angle from the horizontal as shown at angle D. Consistent with the top side 17 of lower clamp section 16 shown in FIG. 6 at angle A. FIG. 10 shows the underside 19 similarly angled. When secured together as shown in FIG. 11, top section 12 rests over lower section 16 such that groove 14 rests over groove 18. The respective angles of top side 17 and the under side 19 cooperate to form an approximate 6 degree angle between upper section 12 and lower section 16.

FIG. 11 shows fiber optic conductor 37 disposed between upper section 12 and lower section 16 in groove 14 and groove 18, prior to clamping the conductor. Cable 37 has outer strands 39, generally composed of aluminum coated or galvanized steel strands and inner tube 40 which acts to protect the fiber optic core, shown at 4C. Gap 38 is shown formed between upper section 12 and lower section 16. It is expected that gap 38 will vary from 0.01 inches to 0.04 inches depending on cable size, groove diameter, clamp size and material. FIG. 11 also illustrates the angle formed between underside 19 and top side 17. FIG. 11 is shown without U-bolts in place to better illustrate the relationship between the upper section 12 and lower section 16 with respect to a mounted conductor 37.

Figure 12:
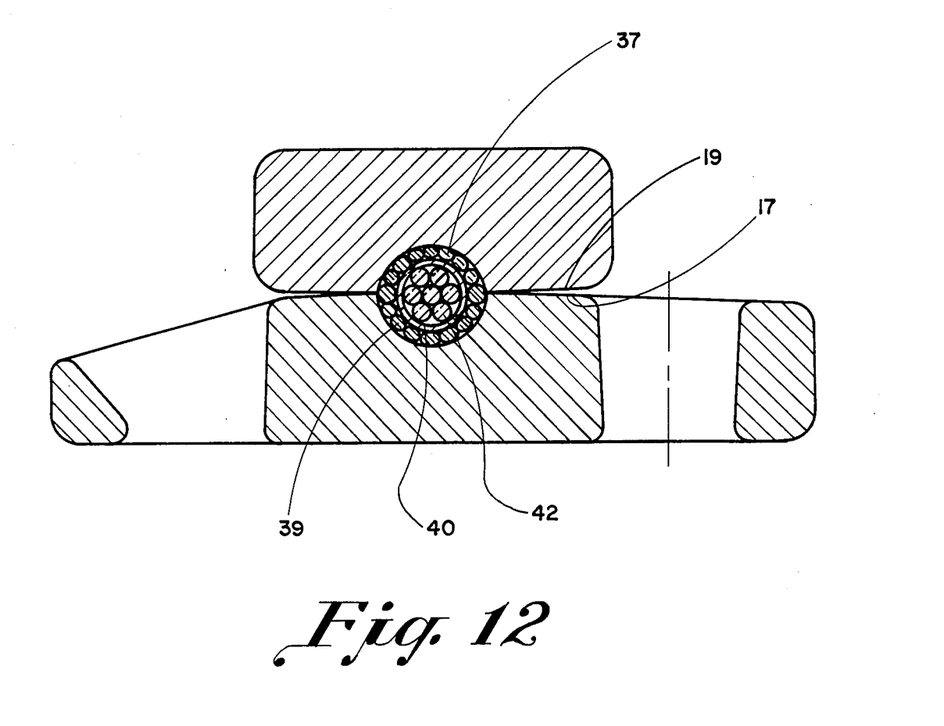
FIG. 12 is a section view of the upper section member and the lower section member having a fiber optic cable therein and showing the clamp stressed about the conductor and deforming strands of the conductor.

FIG. 12 illustrates clamp 10 when torqued by the U-bolts 20(a) and 20(b). Again, the U-bolts have not been shown to better illustrate the deformation of upper section 12 and lower section 16 when stressed. It should be noted that the angle formed by underside 19 and top side 17 has decreased significantly. Also, gap 38 has been reduced such that the grooved portion 18 of lower section 16 is substantially adjacent grooved portion 14 of upper section 12. The decrease in angle and hence flexing of the grooves 14 and 18 about the cable 37, in combination with the reduction in gap 38 provides an evenly spaced radial force around the circumference of conductor 37. Since this force is evenly distributed about the circumference of the conductor, the force is not concentrated at any one point which would otherwise crush the fiber optic strands in the conductor 37. This clamping force is distributed across the entire length of the clamp 10 and creates a strong mechanical clamp of the conductor 37 yet, preserves the fiber optic cables disposed therein.

The material used in the clamp 10 is ideally aluminum, which will cooperate well with the fiber optic cable which has outer strands of aluminum coated or galvanized steel. The strength of most fiber optic cables is anticipated at 10,000 lbs. to 20,000 lbs. in tension. A clamp of the present design should withhold 95% of the ultimate tensile strength rating of the cable when clamped. As an example, since the coefficient of friction for aluminum to aluminum is approximately 0.5 a clamp of the present design meeting the tensile rating of a 10,000 lb. conductor would require a 20,000 lb. radial compressive force be exerted on the cable when fully clamped. It is felt that the present design will provide such radial force without damaging the fiber optic portion of the cable.

The invention is not limited to the particular details of construction of the device depicted and other modifications and applications are contemplated. For example, the dimensions and overall shape may be different so long as some means for a clearance between the upper and lower portions of the clamp is provided for flexing of the clamp member over the fiber optic conductor. Different types of clamps may be employed to clamp a fiber optic cable utilizing the same concepts. While one embodiment is shown and describe herein, it should be noted that by varying the thickness of the clamp sections and the type of material used, the amount of flexing experienced by the clamp when torqued can be made to vary. Thus, it is intended that the above described features could be used in connection with other clamps or differently proportioned clamps to achieve a similar result. In the above depiction, a straight line deadend clamp was shown. Other types of clamps may be used in the practice of the invention. Certain other changes may be made in the above described device without departing from the true spirit and scope of the invention herein involved. It is intended therefore that the subject matter in the above depicting be interpreted as illustrative and not in a limiting sense.

We claim:

1. An apparatus for clamping a conductor comprising an upper section with two opposing elongated sides and lower section with two opposing elongated sides, said upper and lower sections having means for receiving and maintaining a cable therein, said upper section having on a first elongated side at least one U-bolt with corresponding nuts secured thereto and a means for securing at least one U-bolt thereto such that the U-bolt is captively held to the upper section adjacent the first elongated side; and said second elongated side of said upper section having at least one U-bolt with corresponding nuts releasably secured thereto and having means for releasably maintaining at least one U-bolt adjacent the second elongated side; said means for releasably maintaining at least one U-bolt adjacent the second elongated side of the upper section comprising a groove formed in the upper section and adjacent the second elongated side, said groove having a pair of opposing walls defining the ends thereof, where one of said walls is an outer wall with respect to the second elongated side of the upper section and said outer wall has a height and width substantially reduced from that of the other wall such that the U-bolt placed in said groove will be maintained there when torqued into the clamp, but will be able to clear the outer wall when loosened to permit the upper section to be lifted off of the lower section to expose the means for receiving a cable therein, said lower section having on a first elongated side, corresponding to the first elongated side of the upper section, means for securing said U-bolt thereto; said lower section having on said second elongated side, corresponding to the second elongated side of the upper section, means for releasably retaining a leg of said U-bolt said means for releasably retaining a leg of said U-bolt comprising a slot formed in the lower section and adjacent the second elongated side, said slot receiving a leg of the U-bolt such that the slot will provide mean against which the U-bolt and a nut threaded thereon can be torqued against the upper and lower sections of the clamp and will allow the leg of the U-bolt to pivot away from the clamp when said nut is loosened and when the U-bolt is lifted off of the outer wall of the groove on the upper clamp section, and means for allowing said U-bolt to clear the cable receiving area of the clamp when the upper clamp section is removed from the lower clamp section said means for allowing the U-bolt to clear the cable receiving area of the clamp comprising an opening in the second elongated side of the lower section, said opening cooperating with the slot to receive the other leg of the U-bolt and to provide means against which the U-bolt is torqued against the clamp; said opening having a beveled section therein adjacent an outer side of the opening with respect to the second elongated side, said beveled section allowing the U-bolt, when removed from the groove adjacent the second elongated side of the upper section, to tilt away from cable receiving area of the clamp such that the U-bolts, when assembled therein, cooperate to allow the upper section to be removed from the lower section to expose the cable receiving area, without disassembling the U-bolts from the clamp or the upper section from the lower section.

2. The apparatus of claim 1 where the means for captively securing the U-bolt to the first elongated side of the upper section comprises a groove formed on the upper section adjacent the first elongated side; said groove having two opposing walls defining each side of the groove, said walls cooperating to maintain the U-bolt in the groove, each said wall having thereon a retainer crimped over the U-bolt when the U-bolt is inserted in the groove to captively hold the U-bolt in the groove.

3. The apparatus of claim 2 where the means for securing the U-bolt to the first elongated side of the lower section comprises a pair of openings formed in the lower section and adjacent the first elongated side, said openings receiving the legs of the U-bolt therethrough for bolting the U-bolt to the clamp.

* * * * *